US010196310B2

(12) United States Patent
Zubrod et al.

(10) Patent No.: US 10,196,310 B2
(45) Date of Patent: Feb. 5, 2019

(54) COLD FUSION CONCRETE

(71) Applicant: Geopolymer Solutions LLC, Coral Springs (FI)

(72) Inventors: Rodney Zubrod, The Woodlands, TX (US); Mark Gerhardt, Coral Springs, FL (US)

(73) Assignee: Geopolymer Solutions LLC, Coral Springs, FL (US)

( * ) Notice: Subject to any disclaimer, the term of this patent is extended or adjusted under 35 U.S.C. 154(b) by 20 days.

(21) Appl. No.: 15/228,781

(22) Filed: Aug. 4, 2016

(65) Prior Publication Data
US 2018/0037505 A1 Feb. 8, 2018

(51) Int. Cl.
*C04B 28/08* (2006.01)
*C04B 14/06* (2006.01)
*C04B 14/22* (2006.01)
*C04B 16/06* (2006.01)
*C04B 22/08* (2006.01)
*C04B 24/08* (2006.01)
*C04B 24/14* (2006.01)
*C04B 28/00* (2006.01)
*C04B 28/02* (2006.01)
*C04B 103/22* (2006.01)
*C04B 111/00* (2006.01)
*C04B 111/20* (2006.01)
*C04B 111/23* (2006.01)
*C04B 103/65* (2006.01)

(52) U.S. Cl.
CPC .............. *C04B 28/08* (2013.01); *C04B 14/06* (2013.01); *C04B 14/22* (2013.01); *C04B 16/0641* (2013.01); *C04B 16/0691* (2013.01); *C04B 22/08* (2013.01); *C04B 24/08* (2013.01); *C04B 24/14* (2013.01); *C04B 28/006* (2013.01); *C04B 28/02* (2013.01); *C04B 2103/22* (2013.01); *C04B 2103/65* (2013.01); *C04B 2111/00448* (2013.01); *C04B 2111/2015* (2013.01); *C04B 2111/23* (2013.01)

(58) Field of Classification Search
CPC ......... C04B 28/08; C04B 14/06; C04B 14/22; C04B 22/08; C04B 16/0691; C04B 16/0641; C04B 24/14; C04B 24/08; C04B 2103/22; C04B 2111/00448; C04B 2111/23; C04B 2111/2015
See application file for complete search history.

(56) References Cited

U.S. PATENT DOCUMENTS

| | | | |
|---|---|---|---|
| 5,352,288 A | 10/1994 | Mallow | |
| 5,482,549 A | 1/1996 | Blaakmeer et al. | |
| 6,749,679 B2 | 6/2004 | Shi | |
| 7,727,327 B2 | 6/2010 | Glessner et al. | |
| 8,202,362 B2 | 6/2012 | Davidovits et al. | |
| 2002/0157573 A1 | 10/2002 | Pellett | |
| 2012/0037043 A1 | 2/2012 | Zubrod | |
| 2014/0047999 A1 | 2/2014 | Razl | |
| 2014/0251186 A1 | 9/2014 | Cross | |
| 2014/0264140 A1 | 9/2014 | Gong et al. | |
| 2014/0360721 A1 | 12/2014 | Getzlaf et al. | |
| 2015/0107491 A1 | 4/2015 | Ball et al. | |
| 2015/0122154 A1 | 5/2015 | Diaz-Loya et al. | |
| 2015/0321954 A1 | 11/2015 | Chalmers et al. | |
| 2015/0343666 A1 | 12/2015 | Huang | |

FOREIGN PATENT DOCUMENTS

| | | |
|---|---|---|
| CN | 101759383 | 6/2010 |
| CN | 104291740 | 1/2015 |
| EP | 0520413 B1 | 3/1997 |
| WO | 9533698 | 12/1995 |
| WO | 2006084670 A2 | 8/2006 |
| WO | 2011085365 | 7/2011 |
| WO | 2013048351 | 4/2013 |
| WO | 2013123181 A1 | 8/2013 |
| WO | 2015049010 | 4/2015 |

(Continued)

OTHER PUBLICATIONS

"2016 Florida Limited Liability Company Annual Report" MDPHX LLC (Mar. 2016).*
"2017 Florida Limited Liability Company Annual Report" MDPHX LLC (Mar. 2017).*
"2018 Florida Limited Liability Company Annual Report" MDPHX LLC (Mar. 2018).*
PHX Safety Data Sheet, "Product Name: Phx (a Proprietary Blend of Plant Oils & Pollinated Esters) A Commercially available plant oil extract", MDPHX LLC (Jul. 2012).*
Sunbiz.org Division of Corporations, Florida Limited Liability Company MDPHX LLC, Document Number:L14000133200 FEI/EIN Number:47-1722447, (Aug. 2014).*

(Continued)

*Primary Examiner* — Anthony J Green
(74) *Attorney, Agent, or Firm* — The Concept Law Group, PA; Lance Johnson; Scott D. Smiley

(57) ABSTRACT

A cold fusion concrete formulation including a mixture of water, silicon based mineral aggregates acting as a filler material; sodium or potassium metasilicate/pentahydrate acting as an activator; waste from steel production including Granulated Ground Blast Slag acting as a cementitious ingredient; high calcium or low calcium waste from coal combustion (fly ash or bottom ash) acting as a cementitious ingredient; sodium tetraborate, sodium citrate dihydrate, citric acid, or boric acid acting as set-time retarders; strengthening agents including calcium, potassium, magnesium, sodium, or aluminium hydroxides; attapulgite, kaolin, red, or other fine grained, high alumino silicate containing clay, for increasing the silicon and alumino-silicate concentration and associated strength; a protein or synthetic protein material to form a weak covalent bond with the hydroxides and silicates, for the purpose of maintaining a consistent volume during the curing process; and a pollinated fern oil to reduce water content of the mixture and decrease viscosity.

15 Claims, No Drawings

(56) References Cited

FOREIGN PATENT DOCUMENTS

| | | |
|---|---|---|
| WO | 2015062860 | 5/2015 |
| WO | 2015089611 A1 | 6/2015 |
| WO | 2015199291 A1 | 12/2015 |

OTHER PUBLICATIONS

Juenger et al., Advances in alternative cementitious binders, journal, Cement and Concrete Research (Journal), 2011, pp. 1232-1243, vol. 41.
Aguilar et al., Lightweight concretes of activated metakaolin-fly ash binders, with blast furnace slag aggregates, journal, Construction and Building Materials, 2010, pp. 1166-1175, vol. 24.
Goh et al., Complex Rheological Properties of a Water-Soluble Extract from the Fronds of the Black Tree Fern, Cyathea medullaris, Journal, Biomacromolecules, Oct. 16, 2007, pp. 3414-3421, vol. 8.
Database WPI, Week 201529, Jan. 21, 2015, Thomson Scientific, London, GB, AN 2015-157006, XP002774580, pp. 1-3.
Database WPI, Week 201056, Jun. 30, 2010, Thomson Scientific, London, GB, AN 2010-J98576, XP002774581, p. 1.

\* cited by examiner

COLD FUSION CONCRETE

FIELD OF THE INVENTION

This invention relates to concrete materials, and methods for creating concrete materials, that do not require heat or other special curing processes to produce various construction materials. More particularly, the invention relates to products, and methods for their production, that significantly reduce the generation of carbon dioxide and other greenhouse gases during production, unlike Portland Cement and typical Geopolymer cements. Most particularly, this invention relates to cold fusion concretes and cements that use no liquid or dry hydroxide additives as a primary activator or a pH elevator.

BACKGROUND OF THE INVENTION

Cements and concrete formulations used by various industries, such as the construction industry, generally require the use of significant amounts of energy for their manufacture. The purpose of the present invention is to provide materials, and methods for creating materials, that do not require heat or other special curing processes for their production. Unlike Portland Cement and typical Geopolymer cements, the cold fusion concrete and cement formulations of the present invention significantly reduce the generation of carbon dioxide and other green-house gases during production. Further, another advantage of the invention is that it utilizes basic processes and materials that may be incorporated into existing production facilities and methodologies. A further purpose is to increase the quality of the product by reducing damage to constructed features from, for example, exposures to adverse climatic conditions (such as extreme or variable weather), extreme heat, damaging chemicals such as chlorides, sulfates, acids, or the like.

DESCRIPTION OF THE PRIOR ART

U.S. Published Patent Application 2015/0122154, published May 7, 2015 to Diaz-Loya et al., teaches a pozzolanic cement composition and method for its manufacture. These cement compositions may include a pozzolanic material and an activator based on a salt of glycolic acid, glyceric acid, malic acid, tartaric acid, malonic acid, glutaric acid, maleic acid, formic acid, acetic acid, propionic acid, or butyric acid, a retarder based on hepto-gluconates, sulfate salts, sugars, sugar acids, lignins, and/or an accelerator based on amines.

U.S. Published Patent Application 2014/0264140, published Sep. 18, 2014, to Gong et al., is directed towards a composite binder which contains one or more Class F fly ash materials, one or more gelation enhancers, and one or more hardening enhancers, wherein each of the one or more Class F fly ash materials comprises 15 wt. % or less calcium oxide, and wherein the composite binder is a Portland cement-free binder for concrete.

Published International Application WO 2015199291A1 discloses carbon dioxide reduction type concrete composition containing fly ash and blast furnace slag.

U.S. Published Patent Application 2014/0360721, published Dec. 11, 2014, to Getzlaf et al., teaches a cement composition comprising industrial waste containing calcium oxide and a retarder. The cement composition is free of Portland cement. The composition also includes an alkali metal oxide, a hydrocarboxylic acid, and a sulphate compound.

U.S. Published Patent Application 2014/0251186, published Sep. 11, 2014, to Cross, is directed to a cement or cementitious mixture that includes fly ash, zinc oxide and borate. A borate compound is used as a set retarder.

U.S. Published Patent Application 2014/0047999, published Feb. 20, 2014, to Razl, is directed toward a process for the production of acid and high temperature resistant cement composites, where the matrix is alkali activated F fly ash alone, F Fly ash combined with ground slag or ground slag alone. F-fly ash produces lower quality alkali activated cement systems.

U.S. Pat. No. 8,202,362, issued Jun 19, 2012, to Davidovits et al., discloses a geopolymeric cement based on an aluminosilicate fly ash of class F and blast furnace slag.

U.S. Published Patent Application 2015/0321954, published Nov. 12, 2015, to Chalmers et al., discloses a geopolymer cement containing fly ash and granulated blast furnace slag. The application particularly states that "at least one silico-aluminate material may comprise any one or a combination of fly ash, pitchstone, blast furnace slag, ground glass or zeolite. Preferably, the at least one silico-aluminate material comprises fly ash and granulated blast furnace slag.

U.S. Published Patent Application 2015/0107491, published Apr. 23, 2015, to Ball et al., discloses a cementitious binder containing ground granulated blast furnace slag (GGBS) and pulverized fuel ash. The Abstract of the application particularly calls for "A cementitious binder comprises at least 90% by weight of a hydraulically-active material comprising ground granulated blast furnace slag (GGBS) and/or pulverised fuel ash (PFA), and at least 0.1% by weight of CaO in an activator composition for the hydraulically-active material. The cementitious binder does not comprise any Portland cement and is, therefore, more environmentally friendly. The binder further comprises a superplasticiser such as a polycarboxylate ether (PCE). A concrete, mortar, grout, screed or render may be formed from a mixture of the cementitious binder, aggregate particles, water and superplasticiser.

Published International Application WO 2015089611A1, to Pianaro discloses a geopolymer cement produced from recycled glass.

None of the prior art references teach cold fusion concretes and cements that use no liquid or dry hydroxide additives as a primary activator or a pH elevator.

SUMMARY OF THE INVENTION

Disclosed herein are materials, and methods for creating materials, that do not require heat or other special curing processes to produce various construction materials. One purpose of the materials and methods disclosed herein is, at least, to provide industries, such as the construction industry, with a product that significantly reduces the generation of carbon dioxide and other green-house gases during production, unlike Portland Cement and typical Geopolymer cements. Further, another advantage of the invention is that it utilizes basic processes and materials that may be incorporated into existing production facilities and methodologies. A further purpose is to increase the quality of the product by reducing damage to constructed features from, for example, exposures to adverse climatic conditions (such as extreme or variable weather), extreme heat, damaging chemicals such as chlorides, sulfates, acids, or the like.

Accordingly, it is a primary objective of the instant invention to provide a cold fusion concrete formulation from a mixture of water acting as a lubricant and activator; silicon based mineral aggregates of various diameter sizes ranging from about the 0.02 mm sieve to 6-inches acting as a filler material; anhydrous or hydrous sodium or potassium metasilicate/pentahydrate acting as an activator; waste from steel production including Granulated Ground Blast Slag acting as a cementitious ingredient; high calcium or low calcium waste from coal combustion (fly ash or bottom ash) acting as a cementitious ingredient; sodium tetraborate, sodium citrate dihydrate, citric acid, or boric acid acting as set-time retarders; metal hydroxides including calcium, potassium, magnesium, sodium, or aluminum to be balanced in order to achieve strength; attapulgite, kaolin, red, or other fine grained, high alumino silicate containing clay, that is calcined or otherwise processed to reduce or remove the organic content and organic characteristic for the purpose of increasing the silicon and alumino-silicate concentration and associated strength; a protein or synthetic protein material achieving the same characteristics as protein that is able to form a weak covalent bond with the hydroxides and silicates, therein altering the ion concentration of the hydroxides and silicates for the purpose of maintaining a consistent volume during the curing process, and to reduce the sticky/tacky characteristic of silicates; and a fern oil to reduce the water content of the mixture and decrease viscosity. The preferred fern oil is a product sold under the tradename Pollinated Fern Oil™ by MDPHX, LLC or Coral Springs, Fla.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Certain aspects, modes, embodiments, variations and features of the invention are described herein in various levels of detail to provide further understanding of embodiments related to compositions comprising Cold Fusion Concretes or Cements, and methods related to making and using such compositions.

Definitions

As used herein, the term "Portland Cement" refers to any cement referred to by the terms Ordinary Portland Cement (OPC), Portland, Blended Hydraulic Cement, Simple Cement, Blended Pozzolan Cement, Pozzolan Cement, or other industry characterizations or jargon descriptions where the material may be used to bind a composition of mineral aggregates, lightweight aggregates, synthetic aggregates, or no aggregates, water, and chemicals into a mass that hardens and is used in structures or features that may or may not be governed by codes including the International Code Council (ICC), the American Association of State Highway and Transportation Officials (AASHTO), The American Society for Testing and Materials (ASTM), The American Concrete Institute (ACI), or similar International Transportation, Building, or Maintenance Agency. Portland Cement includes modified materials including those blended with Fly Ash and other Pozzolans, high calcium content cements, non-sulfate containing cements, sulfate resistant cements, high-early strength cements, and air-entrained cements.

As used herein, the term "Geopolymer Cement" is an industry term characterizing silicon dioxide and aluminium bearing pozzolans that are activated and bound by alkalis, alkali salts, alkali hydroxides, and oxides, that form a hardened material used in the transportation, building industry, and as a specialty chemical and/or heat resistant concrete. Geopolymer Cements may or may not contain Portland, most typically contain liquid hydroxides and silicates, and most typically require heat treatment to attain durability characteristics.

As used herein, the term "Polyvinyl Alcohol" refers to water soluble synthetic polymers derived from the polymerization of vinyl acetate and polyvinyl acetate. Polyvinyl Alcohol is also referred to as PVA, PVAI, PVOH, and Vinyl Alcohol. Polyvinyl Alcohol is fully or partially hydrolyzed. The appropriate viscosity is determined through trial batch tests, but any viscosity that achieves hydrofluoric acid resistance is appropriate.

As used herein, the term "Cold Fusion Concrete" or "Cold Fusion Cement" are industry terms characterizing silicon dioxide and aluminium bearing pozzolans that are activated and bound by alkalis, alkali salts, and alkali hydroxides and oxides that are inherent to installed pozzolans, that form a hardened material used in the transportation, building industry, and as a specialty chemical and/or heat resistant concrete. Cold Fusion Concrete and Cement may or may not use Portland materials and uses no liquid hydroxide additives as a primary activator or a pH elevator. Cold Fusion Concrete or Cement, in accordance with the present disclosure.

As used herein, the term "Cementitious Materials" refers to a fine grained material, which has cementing value when used in concrete either by themselves, such as Portland cement, blended hydraulic cements, and expansive cement, or such materials in combination with fly ash, other raw or calcined natural pozzolans, silica fume, and/or ground granulated blast-furnace slag.

As used herein, the term "Fumed Silica" refers to a man-made fine grained material, consisting of a minimum 90% silicon dioxide. Silica fume may or may not be pozzolanic. Other fine grained silicon dioxide bearing materials may be substituted such as fine grained mineral clays, ground glass, silicon gel, or other similar materials.

As used herein, the term "Fly Ash"(Class C or Class F) material refers to a coal combustion by-product from power generation that may or may not be classified under the Standard ASTM C618 Specification. Fly ash is the finer product from coal combustion that is collected from the flu-gas stream by electrostatic precipitators and/or baghouses and used in Geopolymer, Portland, and Cold Fusion cements and concrete as a cementitious material and mitigation of alkali-silica reaction. Fly ash may be replaced in whole or in part with silica fume, which is a coal combustion by-product obtained from the flu gas stream, or classified fly ash. Classified fly ash for the purpose intended herein, is a standard Class C or Class F Fly Ash where finer or coarser particles have been separated and either the finer or coarser portion utilized.

As used herein, the term Granulated Ground Blast Furnace Slag (GGBFS) is a by-product obtained during the production (quenching) of metal products and objects including iron, copper, brass, and others. GGBFS typically contains elevated concentrations of silicon dioxide, aluminium, calcium, and other reactive products that when mixed in Geopolymer, Portland, or Cold Fusion cement and concrete, aids in the development of strength and mitigates alkali-silica reaction.

As used herein, the term "Silicon Based Mineral Aggregates" refers to any natural or synthetic aggregate that is crushed or rounded and useful as a filler in Portland, Geopolymers, and Cold Fusion types of concrete. Aggregates are a granular material, such as sand, gravel, crushed stone, and iron blast-furnace slag, used with a cementing medium to form a concrete or mortar. High silicon bearing materials are often quartzite, marble, and other alluvial, sedimentary, and chemically bonded minerals with unconfined strengths corresponding to about 10 (lightweight) to 40,000 psi (normal and heavyweight). Aggregate materials containing carbonates, or carbon may be used as replacements when chemical resistance is unnecessary.

As used herein, the term "Bottom ash" refers to a coal combustion by-product from power generation that is not classified under the Standard ASTM C618 Specification. Bottom ash is the coarse product from coal combustion that is collected from the bottom of the boiler and useful in Geopolymer, Portland, and Cold Fusion cements and concrete as a cementitious material and lightweight aggregate.

As used herein, the term "Set Time Retarders" refers to any dry or liquid admixture added to Portland, Geopolymer, or Cold Fusion cements and concretes to retard the time of setting, and to provide more work-ability time during construction and maintenance efforts of various features. The following are illustrative, albeit non-limiting examples of compounds useful as either set time retarders, and/or activation and rheology enhancers.

(1) Sodium tetraborate also known as borax, sodium borate, or disodium tetraborate, is a boron compound, a mineral, and a salt of boric acid. Powdered sodium tetraborate/borax is white, and contains soft colorless crystals that dissolve easily in water. Sodium tetraborate is often used as a set time retarder, activation and rheology enhancer for Geopolymers and Cold Fusion types of cement and concrete.

(2) When Portland Cement is used, typical surfactant, lignant, Portland industry set time retarders, rheology modifiers, and water reducers may be used such as those purchased from SIKA, BASF Construction Chemicals, W.R. Grace, Euclid, and other suppliers.

(3) Sodium citrate dihydrate has the chemical formula of Na3C6H5O7. It is sometimes referred to simply as sodium citrate, though sodium citrate can refer to any of the three sodium salts of citric acid. Sodium citrate dihydrate is often used as a set time retarder, activation and rheology enhancer for Geopolymers and Cold Fusion types of cement and concrete.

(4) Citric acid is a weak organic tribasic acid having the chemical formula C6H8O7. It occurs naturally in citrus fruits. In biochemistry, it is an intermediate in the citric acid cycle, which occurs in the metabolism of all aerobic organisms. Citric acid is often used as a set time retarder, for Geopolymers and Cold Fusion types of cement and concrete.

(5) Boric acid, also called hydrogen borate, boracic acid, orthoboric acid and acidum boricum, is a weak, monobasic Lewis acid of boron often used as an antiseptic, insecticide, flame retardant, neutron absorber, or precursor to other chemical compounds. It has the chemical formula H3BO3 (sometimes written B(OH)3), and exists in the form of colorless crystals or a white powder that dissolves in water. When occurring as a mineral, it is called sassolite. Boric acid is often useful as a set time retarder for Geopolymers and Cold Fusion types of cement and concrete.

As used herein, the term "High Alumino Silicate Containing Clay" refers to any naturally occurring mineral material useful in Portland, Geopolymer, and Cold Fusion cements and concrete such as Kaolin, Red, and Attapulgite clays that have an organic content of less than 2% (wt/wt), but an elevated silicon dioxide content of at least 40% (wt/wt) and an aluminium content at least 15% (wt/t). Other naturally occurring minerals may be used as replacements including zeolites, diatomaceous earth, volcanic minerals, and other similar materials.

As used herein, the term "Protein" or "Synthetic Protein Material" refers to large biomolecules, or macromolecules, inclusive of one or more long chains of amino acid residues. For the protein to be useful in Geopolymer or Cold Fusion types of cements or concrete, the DNA chain must produce a covalent bond between the mixture silicates and produced hydroxides, therein temporarily adjusting the ionic concentration (up or down) and reducing and/or removing the sticky and tacky characteristic inherent in most Geopolymer types of cement, and reducing mixture volume change from a higher quality restructuring of the ions during reformation after the protein effect has terminated due to a pH reduction, temperature deviation, or time.

As used herein, the term "Pollinated Fern Oil" refers to a commercially available plant extract material supplied under that tradename by MDPHX, LLC, based in Coral Springs, Fla.

As used herein, the term "Fluorosurfactants" are synthetic organofluorine chemical compounds that have multiple fluorine atoms. They can be polyfluorinated or fluorocarbon-based (perfluorinated) but are non-reactive when exposed to hydrofluoric acid and other silicon dioxide corrosive acids. Fluorosurfactants are useful in Geopolymer and Cold Fusion types of concrete to reduce the surface tension of water and adjust the rheology of mixtures where polyvinyl alcohols are used.

As used herein, the term "Light-Weight Filler Materials" refers to naturally occurring lightweight mineral aggregates and other synthetic materials useful as aggregates and void creating fillers in concrete mixtures. Light-Weight Filler Materials include any natural or synthetic material with a bulk specific gravity of less than 1.0. Light-weight filler materials are used to reduce the composite weight of mixtures for structural weight limitation purposes, to enhance insulation properties, and improve the resistance of mixtures to elevated heat conditions including fires. Light-weight filler materials may include items such as, but not limited to, vermiculite, volcanic cinders, expanded glass, expanded shale, manmade and or coal combustion by-product cenospheres, synthetic or protein air voids, and other manmade or naturally occurring and void creating materials.

As used herein, the term "Fibers" refers to manmade micro (thin) and macro (thick), or deformed fibers produced commercially for the specific purpose of replacing conventional reinforcing steel, removing or reducing concrete cracking, adjusting modulus characteristics, improving strength, and adjusting concrete mixture rheology. Fibers are typically formed from PVC, steel, nylon, KEVLAR™ (Kevlar is the registered trademark for a para-aramid synthetic fiber), glass, basalt, and ceramic of variable denier, length, and shape.

As used herein, the term "Slump" refers to a measurement of concrete's workability, or fluidity. It's a direct measurement of concrete consistency or stiffness.

As used herein, the term "Concrete Slump Test" refers to the measurement of a property of fresh concrete and is typically governed by the Standard ASTM C143 test method. The test is an empirical test that measures the workability of fresh concrete, and when used on many batches during larger placements, it measures consistency between batches. The slump test result is a measure of the behavior of a compacted inverted cone of concrete under the action of gravity. It measures the consistency or the wetness of concrete.

As used herein, the term "Saturated Surface Dry" is an empirical value used to assess the optimal or design moisture content of mineral sands and aggregates used in concrete. The saturated surface dry moisture content is typically determined by the Standard ASTM C127 and C128 test methods for coarse aggregates and fine aggregates, respectively. "Saturated Surface Dry" may be defined as the condition of an aggregate in which the surfaces of the particles are "dry" (i.e., surface adsorption would no longer take place), but the inter-particle voids are saturated with water. In this condition aggregates will not affect the free water content of a composite material.

As used herein, the term "Saturated Wet" may be defined as the condition of an aggregate in which all pores are completely filled with water with a film on the surface.

As used herein, the term "Air-Dry" may be defined as the condition of an aggregate in which all moisture is removed from the surface, but internal pores are partially full.

As used herein, the term "Oven-Dry" may be defined as the condition of an aggregate in which all moisture is removed from the aggregate by heating in an oven at 105° C. to constant weight (overnight heating usually is sufficient), and all pores are empty.

The term "about" or "approximately" as used herein means within an acceptable error range for the particular value as determined by one of ordinary skill in the art, which will depend in part on how the value is measured or determined, i.e., the limitations of the measurement system. Where particular values are described in the application and claims, unless otherwise stated, the term "about" means within an acceptable error range for the particular value.

Unless otherwise indicated, all material requirements are expressed as wt/wt %, understood to be the mass of a particular constituent over the mass of the entire mixture, as indicated, inclusive of water×100%.

In one embodiment, the present invention is directed toward a cold fusion concrete or cement formed from a mixture of water acting as a lubricant and activator; silicon based mineral aggregates of various diameter sizes ranging from about the 0.02 mm sieve to 6 inches acting as a filler material; anhydrous or hydrous sodium or potassium metasilicate/pentahydrate acting as an activator; waste from steel production including granulated ground blast furnace slag acting as a cementitious ingredient; high calcium or low calcium waste from coal combustion (fly ash or bottom ash) acting as a cementitious ingredient; sodium tetraborate, sodium citrate dihydrate, citric acid, or boric acid acting as set-time retarders; metal hydroxides including calcium, potassium, magnesium, sodium, or aluminum to be balanced in order to achieve strength; attapulgite, kaolin, red, or other fine grained, high alumino silicate containing clay, that is calcined or otherwise processed to reduce or remove the organic content and organic characteristic for the purpose of increasing the silicon and alumino-silicate concentration and associated strength; a protein or synthetic protein material achieving the same characteristics as protein that is able to form a weak covalent bond with the hydroxides and silicates, therein altering the ion concentration of the hydroxides and silicates for the purpose of maintaining a consistent volume during the curing process, and to reduce the sticky/tacky characteristic of silicates; and a fern oil to reduce the water content of the mixture and decrease viscosity.

The water should be potable, but non-potable water may be used if mixture constituents are varied to accommodate the use of non-potable water due to variable water sources with varying pH, mineral content, fluoride, and other chemicals and ingredients.

The aggregates should include high silicon dioxide bearing materials such as quartzite, marble, and other alluvial, sedimentary, and chemically bonded minerals with unconfined strengths corresponding to about 10 (lightweight) to about 40,000 psi (normal and heavyweight). The aggregates are generally but not specifically required to comply with the durability and grain size stipulations in the American Society of Testing and Materials (ASTM) C33, Standard Specification for Aggregates used in concrete, and typically, but not required to be combined at concentrations defined by various specifications in the American Concrete Institute Manual of Concrete Practice including ACI 318, ACI 301, ACI 211, and ACI 506. Water contents of the mixture are revised for the aggregates to produce a cohesive and viscous material and accommodate a calculated mixture volume of 1 cubic meter, or 27 cubic feet per yard, and required strengths in the range of from about 25 (lightweight) pounds per square inch (psi) to about 20,000 (normal and heavyweight) psi in 2 hours to 56-days with variable curing environments including electrical curing, heat curing, laboratory curing, and, ambient condition curing in variable geographic climates including average daily mean temperatures of from −50 to 140 degrees Fahrenheit, and variable barometric pressures.

The fern plant extract material is added to the aggregates prior to the addition of cementitious materials and water. The fern plant extract reduces the water requirement of the mixture created from the coat-able surface area of the cementitious materials and aggregates. The reduction of the water demand of the mixtures increases strength and reduces plastic, drying, and autogenous mixture volume change. The fern plant extract should be designed for each mixture, but should be similar to the fern plant extract supplied by MDPHX, LLC, based in Coral Springs, Fla under the tradename Pollinated Fern Oil™.

The above material concentrations are adjusted and balanced within the mixture volume required to achieve a sufficient strength, loss of permeability, and silicon dioxide content that achieves a resistance (less than 5% loss in mass) to concentrations of sulfuric acid ranging from about 0.01% to about 98%; concentrations of hydrochloric acid ranging from about 0.01% to about 57%; concentrations of nitric acid ranging from about 0.01% to about 68%; concentrations of phosphoric acid ranging from about 0.01% to about 98%; concentrations of acetic acid ranging from about 0.01% to about 98%; and, all concentrations and exposures to all chlorides and all sulfates without mass loss degradation or volume change for continuous submerged exposures ranging from 1 to 730 days.

In another embodiment, constituent concentrations are maintained and balanced, while reducing or eliminating the presence of sodium tetraborate, thereby avoiding extreme thickening and rheology change, in the presence of Polyvinyl Alcohol (PVA), which is added in an amount effective to maintain the mixtures cured resistance to water damage, while achieving resistance (less than 5% loss in mass) to hydrofluoric acid degradation at submerged concentrations of from about 0.01% to about 55% for from 1 to 90 days. The viscosity and hydrolyzed content of PVA are used to achieve various mixture rheological, viscosity, aggregate suspension, and time of set characteristics. In the event that PVA concentrations become too elevated to achieve hydrofluoric acid resistance and the mixture loses cohesion necessary for placement, strength, or pumping, fluorosurfactants are added to elevate the wetness of the mixture and revise rheological behavior, while maintaining strength and permeability characteristics, and further protecting the mixture from hydrofluoric acid degradation. In the event some coal combustion waste, steel waste, silicates, or other mixture constituents prohibit sufficient cured mixture permeability reduction, the high silicon dioxide bearing mineral aggregates are removed and replaced with butyl rubber, plastic, or other hydrofluoric acid resistant filler material, or, a neat cement mixture is placed without risk of aggregate degradation from hydrofluoric acid exposure and the relative expansion of aggregate digestion.

In an alternative embodiment, the high silicon dioxide bearing hard and durable aggregates, PVA, and fluorosurfactants are removed and replaced with light-weight filler materials such as, but not limited to, vermiculite, volcanic cinders, expanded glass, expanded shale, manmade and or coal combustion by-product cenospheres, synthetic or protein air voids, and other manmade or naturally occurring and void creating materials. Sodium tetraborate, sodium carbonate, or other similar materials are added to the mixture to increase the mixtures resistance to heat, and to increase the material working time. The light-weight filler materials, coal or steel waste, sodium tetraborate, sodium carbonate, sodium or potassium metasilicate, protein, water, and plant extract are combined at concentrations that achieve desired density ranging from about 20 pounds per cubic foot (pcf) to about 100 pounds pcf with relative strengths ranging from about 50 psi to about 6,000 psi in 28 days of air curing, or accelerated curing using heat or electricity.

In certain of the embodiments, the size and concentrations of the filler materials, and the concentrations of coal or steel waste, sodium tetraborate, sodium carbonate, sodium or potassium metasilicate, protein, and water is selected in order for the mixture to be placed normally, to travel through a typical industry pneumatic application pump device for spray-applied applications or other pneumatic structural placements, e.g fireproofing and other heat resistant applications, and to achieve the desired applied density and strength.

Typical filler material sizes range from about 0.01 mm to about 8 mm. The mixture size and concentration of materials is adjusted to achieve about a 1 hour to about 5 hour thermal resistance to a maximum of 2,000 degrees Fahrenheit for extended periods, and brief (maximum of 5 minutes) exposure to temperatures in excess of 3,000 degrees Fahrenheit.

To avoid any cracking as a result of variable materials or variable batch concentrations, polyvinyl chloride (PVC), steel, nylon, KEVLAR™ (Kevlar is the registered trademark for a para-aramid synthetic fiber), glass, basalt, ceramic, or other micro, macro, or deformed fibers are used in variable dosages dependent upon the cementitious content of the mixture. The fibers may be of variable denier, length, and shape. In the case of glass and other similar fibers, the glass material should be alkali-resistant. In the case of heat resistant mixtures, fibers, such as glass, basalt, and ceramic should be utilized due to the high heat resistance of these materials.

EXAMPLE 1

In order to produce a sand and cementitious material that can be trowel applied, or poured into place, that is resistant to acids, sulfates, chlorides, and heat exposure up to 1,200 degrees Fahrenheit, reagent resistant mineral aggregate such as, but not limited to high silicon dioxide content alluvial quartzite deposits, mined basalt, or mined marble with maximum aggregate sizes of from about ¼-inch to #200 U.S. Mesh sieve (0.0029" or 74 µm) are combined to ratios which create a smooth textured finish, and accommodate a maximum layer thickness to aggregate size ratio of about 3 to 1. The combination will result in a not more than 35% deviation from the maximum density line when examined on an X/Y graph and plotted with the % passing raised to the 0.45 power, densifying the gradation of aggregate to its maximum. The combined aggregate should be, in terms of mass, about 20% (wt/wt) to 75% (wt/wt) of the final cementitious mixture mass including water. Pollinated Fern Oil™ containing fern oil is added to the mineral aggregate in a saturated surface dry, saturated wet, or dry condition (Air-Dry or Oven-Dry) and prior to the inclusion of other mixture ingredients to a fern oil concentration of about 0.05% (wt/wt) to about 1.0% (wt/wt) of the final cementitious mixture mass including water.

Cementitious materials should be combined with the dry materials including the Pollinated Fern Oil™ in the case of dry bagged cementitious mixtures, or separately in the case of wet batched concrete mixtures. The cementitious materials should include, either singly or combined, at least one of fly ash (Class C or Class F), and granulated ground blast furnace slag (GGBFS) added in variable concentrations dependent upon mixture strength, volume change, carbonation, and rheological behavior to mass concentrations ranging to a maximum of 40% (wt/wt), typically from about 8% (wt/wt) to about 40% (wt/wt). Each of the fly ash concentrations and GGBFS concentrations of the mixture should be selected by balancing mass and volume amounts of each in mixture designs until characteristics are as specified by project requirements. The cementitious materials should include sodium or potassium metasilicate, or sodium or potassium metasilicate pentahydrate, added in variable concentrations dependent upon mixture strength, volume change, carbonation, and rheological behavior to mass concentrations ranging from about 2% (wt/wt) to about 7% (wt/wt). Mixture sodium or potassium metasilicate or pentahydrate concentrations should be selected by balancing the mass and volume amounts in mixture designs until characteristics comply with project requirements. The cementitious materials should include sodium tetraborate, sodium citrate dihydrate, or, citric, boric, or silicic acid, added in variable concentrations ranging from about 0.5% (wt/wt) to about 5.0% (wt/wt) by mass of the mixture including water, to reduce mixture air content and to extend the time of set and/or working time. Protein is added as a portion of the cementitious material in concentrations ranging from about 0.01% (wt/wt) to about 0.1% (wt/wt), with the proviso that protein is provided at the minimum concentration which will produce a covalent bond between mixture silicates and produced hydroxides therein temporarily removing the mixture sticky/tacky characteristic and reducing mixture volume change, but less than the amount at which undesirable amounts of air are produced. Water is added to the mixture in mass amounts ranging from about 3% (wt/wt) to about 15% (wt/wt), such that the concentration of water is effective to produce slump consistencies and other characteristics that comply with project requirements for the intended purpose ranging from a masonry mortar consistency for vertical or overhead concrete repairs, masonry mortar joints, horizontal concrete repairs, sealants, liners, to structural walls, slabs, beams, or columns in a consolidated, self-consolidating, or self-leveling application. When all constituents are combined, the material should be mixed for from 2 to 7 minutes prior to placement and/or curing.

The mixture has been formulated in accordance with Table 1, as set forth below.

TABLE 1

| Mixtures: | Low Slump (1" to 3" Slump) | | Medium Slump (2" to 6" Slump) | | High Slump 6" to 10" Slump | | Low Range | High Range |
|---|---|---|---|---|---|---|---|---|
| | \multicolumn{6}{c}{MORTAR CONSISTENCY} | | |
| Size #30 Sand, lbs-% | 982.2 | 26.6% | 963.8 | 26.5% | 952.2 | 26.4% | 10.00% | 50.00% |
| Size #8 Sand, lbs-% | 1473.2 | 39.8% | 1389.2 | 38.2% | 1301.8 | 36.1% | 10.00% | 50.00% |
| GGBFS, lbs-% | 306.9 | 8.3% | 315.5 | 8.3% | 330.4 | 8.7% | 0.00% | 40.00% |
| Class F Fly Ash, lbs-% | 368.3 | 9.9% | 378.2 | 10.4% | 401.4 | 11.1% | 0.00% | 40.00% |
| Metasilicate, lbs-% | 110.5 | 3.0% | 112.8 | 3.1% | 121.8 | 3.4% | 2.00% | 7.00% |
| Tetra borate, lbs-% | 73.7 | 2.0% | 74.4 | 2.0% | 72.2 | 2.0% | 0.50% | 5.00% |
| ¾" PVC Micro Fibers, lbs-% | 2 | 0.05% | 2 | 0.05% | 2 | 0.06% | 0.01% | 0.10% |
| ¼" Nylon Micro Fibers, lbs-% | 3 | 0.08% | 3 | 0.08% | 3 | 0.08% | 0.01% | 0.10% |
| Protein, lbs-% | 2.5 | 0.07% | 2.5 | 0.07% | 2.5 | 0.07% | 0.01% | 0.10% |
| Fern Oil, ozs-% | 88 | 0.16% | 88 | 0.16% | 88 | 0.16% | 0.05% | 1.00% |
| Water, lbs-% | 368.3 | 9.9% | 392.9 | 10.8% | 410.1 | 11.4% | 3.00% | 15.00% |
| Total: | 3696.5 | | 3640.2 | | 3603.3 | | | |

NOTES:
The mass of Fern Oil was calculated for the purpose of mixture mass summation and % of sum mass using the following calculation: ((liquid ounces/128) × (8.33 (weight of water per gallon) × 1.035 (Fern Oil specific gravity))
For this mixture, the slump consistency was increased by adjusting the water content and maintaining the same Fern Oil mass. The slump consistency can also be increased by maintaining the water mass, and increasing the Fern Oil mass.
The individual slump consistency mixture mass weights produce an approximate cubic yard of concrete by volume, based upon the individual material specific gravity.
Larger or smaller aggregate may be used for project specific requirements. The amount of coarser or finer mineral aggregate material is determined based upon the particle shape (fractured or rounded), the particle size, the project requirements, and the mixture rheology as effected by the surface area of finer particles.
While mixing together GGBFS and Fly Ash many times produces specified properties, using only one of the materials can occur.

| Test Results: | Low | Medium | High |
|---|---|---|---|
| Strength, 24 hours, psi | 1850 | 1110 | 1100 |
| Strength, 28 days, psi | 7300 | 6850 | 6910 |
| \multicolumn{4}{c}{% Mass Loss When Submerged In Reagents for 30 days} | | | |
| Reagent | | | |
| Sulfuric Acid (98%) | 0 | 0 | 0 |
| Acetic Acid (60%) | 0 | 0 | 1 |
| Hydrochloric Acid (50%) | 0.1 | 0.1 | 0.1 |
| Nitric Acid (50%) | 0.3 | 0.4 | 0.3 |
| Phosphoric Acid (70%) | 0.1 | 0.4 | 0.4 |
| \multicolumn{4}{c}{% Mass Loss When Subjected to 1,200 Fahrenheit for 10 Minutes} | | | |
| | 1.2 | 2.4 | 2.2 |

EXAMPLE 2

In order to produce a sand, aggregate, and cementitious material that can be trowel applied, or poured into place that is resistant to acids, sulfates, chlorides, and short term (up to approximately 10 minutes) heat exposure up to 2,400 degrees Fahrenheit, reagent resistant materials such as, but not limited to cenospheres, expanded glass, vermiculite, expanded shale, volcanic cinders, entrained air, and other void producing and lightweight filler materials are combined to ratios which create a cementitious mass, and accommodate a maximum layer thickness to aggregate size ratio of about 3 to 1. The combination will result in a maximum 35% deviation from the maximum density line when examined on an X/Y graph and plotted with the % passing raised to the 0.45 power, densifying the gradation of aggregate to its maximum. The combined aggregate should be, in terms of mass, from about 5.0% (wt/wt) to about 40% (wt/wt) of the final cementitious mixture mass including water. Pollinated Fern Oil™ is added to the mineral aggregate, in a saturated surface dry, saturated wet, or dry condition and prior to the inclusion of other mixture ingredients in fern oil concentrations within the range of about 0.05% (wt/wt) to about 1.0% (wt/wt) of the final cementitious mixture mass including water.

Cementitious materials should be combined with the dry mineral aggregate materials including the fern oil in the case of dry bagged cementitious mixtures, or separately in the case of wet batched concrete mixtures. In the case of bagged concrete materials that include mineral aggregate, the fern oil should be mixed with the dry mineral aggregate first, therein allowing the fern oil to absorb into the dry aggregate, then combine the remaining dry cementitious materials. In the case of wet batched concrete mixtures, the fern oil should be added to the saturated surface dry aggregate and mixed for a minimum of 30 seconds, prior to adding the remaining dry materials. The cementitious materials should include, either singly or combined, at least one of fly ash (Class C or Class F), and GGBFS added in variable concentrations dependent upon mixture strength, volume change, carbonation, and rheological behavior to mass concentrations ranging to a maximum of 65% (wt/wt), typically from about 15% (wt/wt) to about 65% (wt/wt). Each of the fly ash concentrations and GGBFS concentrations of the mixture should be selected by balancing mass and volume amounts of each in mixture designs until characteristics are as specified by project requirements. The cementitious materials should include sodium or potassium metasilicate or sodium or potassium metasilicate pentahydrate, added in variable concentrations dependent upon mixture strength, volume change, carbonation, and rheological behavior to mass concentrations ranging from about 3.0% (wt/wt) to about 10% (wt/wt). The metasilicate or pentahydrate concentrations of the mixture should be selected by balancing mass and volume amounts in mixture designs until characteristics comply with project requirements. The cementitious materials should include sodium tetraborate, sodium citrate dihydrate, or, citric, boric, or silicic acid, added in variable concentrations ranging from about 1.0% (wt/wt) to about 5.0% (wt/wt) by mass of the mixture including water, to reduce mixture air content and to extend the time of set and/or working time. Protein is added as a portion of the cementitious material in concentrations ranging from about 0.05% (wt/wt) to about 1.0% (wt/wt), with the proviso that protein is provided at the minimum concentration which will produce a covalent bond between mixture silicates and produced hydroxides therein temporarily removing the mixture sticky/tacky characteristic and reducing mixture volume change, but less than the amount at which undesirable amounts of air are produced. In the event that produced hydroxides are insufficient to produce a covalent bond, calcium hydroxide and other hydroxides can be added as a supplement in concentrations that produce a covalent bond, but do not produce excessive entrapped air. Water is added to the mixture in mass amounts ranging from about 7% (wt/wt) to about 25% (wt/wt), such that the concentration is sufficient to produce slump consistencies and other characteristics that comply with project requirements for the intended purpose ranging from a masonry mortar consistency for vertical or overhead concrete repairs, masonry mortar joints, horizontal concrete repairs, sealants, liners, and/or structural walls, slabs, beams, or columns in a consolidated, self-consolidating, or self-leveling application. When all constituents are combined, the material should be mixed for from 2 to 7 minutes prior to placement and/or curing.

The mixture has been formulated in accordance with Table 2, as set forth below.

TABLE 2

| | Mixtures: | | | |
|---|---|---|---|---|
| | MORTAR CONSISTENCY | | | |
| | Low Slump 1" to 3" Slump | Medium Slump 3" to 6" Slump | Low Range | High Range |
| Expanded Glass 4-8 mm, lbs-% | 80.3-3.6% | 80.3-3.6% | 2.00% | 5.00% |
| Expanded Glass 2-4 mm, lbs-% | 80.3-3.6% | 80.3-3.6% | 2.00% | 5.00% |
| Expanded Glass 0.5-1 mm, lbs-% | 66.9-3.0% | 66.9-3.0% | 2.00% | 5.00% |
| Expanded Glass .1-.3 mm, lbs-% | 40.1-1.9% | 40.1-1.9% | 1.00% | 5.00% |
| GGBFS, lbs-% | 669.1-30.0% | 669.1-30.0% | 0.00% | 65.00% |
| Class F Fly Ash, lbs-% | 776.2-34.6% | 776.2-34.6% | 0.00% | 65.00% |
| Metasilicate, lbs-% | 133.8-6.0% | 133.8-6.0% | 3.00% | 10.00% |
| Tetraborate, lbs-% | 53.5-2.4% | 53.5-2.4% | 1.00% | 5.00% |
| ¼" Nylon Micro Fibers, lbs-% | 6-.07% | 6-.07% | 0.05% | 1.00% |
| Protein, lbs-% | 2-.09% | 2-.09% | 0.05% | 1.00% |
| Fern Oil, ozs-% | 95-.28% | 95-.28% | 0.05% | 1.00% |
| Water, lbs-% | 331.3-14.8% | 331.3-14.8% | 7.00% | 25.00% |
| Total | 2245.9 | 2251.4 | | |

NOTES:
The mass of Fern Oil was calculated for the purpose of mixture mass summation and % of sum mass using the following calculation: ((liquid ounces/128) X (8.33 (weight of water per gallon) X 1.035 (Fern Oil specific gravity))
For this mixture, the slump consistency was increased by adjusting the water content and maintaining the same Fern Oil mass.
The slump consistency can also be increased by maintaining the water mass, and increasing the Fern Oil mass.
For this mixture, high slump consistencies in excess of 6 inches are not recommended due to the light specific gravity of the Expanded Glass (0.45), which is below the specific gravity of water and will cause the aggregate to flow in high slump consistencies.
The individual slump consistency mixture mass weights produce an approximate cubic yard of concrete by volume, based upon the individual material specific gravity.
While mixing together GGBFS and Fly Ash many times produces specified properties, using only one of the materials can occur.

| Test Results: | Low | Medium |
|---|---|---|
| Strength, 24 hours, psi | 1,330 | 1,140 |
| Strength, 28 days, psi | 5,225 | 4,950 |
| % Mass Loss When Submerged In Reagents for 30 days Reagent | | |
| Acetic Acid (60%) | 2.9 | 3.8 |
| Hydrochloric Acid (50%) | 0.8 | 0.8 |
| Nitric Acid (50%) | 4.9 | 5.9 |
| Phosphoric Acid (70%) | 1.1 | 1.2 |
| % Mass Loss When Subjected to 2,400F for 10 minutes | | |
| | 6.6 | 9.2 |

EXAMPLE 3

In order to produce a cementitious mortar material that can be trowel applied, or poured into place that is resistant to various acids but specifically hydrofluoric acid. The cementitious materials should include, either singly or combined, at least one of fly ash (Class C or Class F), and Granulated Ground Blast Furnace Slag (GGBFS) added in variable concentrations dependent upon mixture strength, volume change, carbonation, and rheological behavior to mass concentrations ranging to a maximum of 65% (wt/wt), typically about 10% (wt/wt) to about 65% (wt/wt). Each of the fly ash concentrations and Granulated Ground Blast Furnace Slag (GGBFS) concentrations of the mixture should be selected by balancing mass and volume amounts of each in mixture designs until characteristics are as specified by project requirements. The cementitious materials should include sodium or potassium metasilicate and/or sodium or potassium metasilicate pentahydrate, added in variable concentrations dependent upon mixture strength, volume change, carbonation, and rheological behavior to mass concentrations ranging from about 3.0% (wt/wt) to about 12% (wt/wt). The metasilicate concentrations of the mixture should be selected by balancing mass and volume amounts in mixture designs until characteristics comply with project requirements. The cementitious materials should include sodium citrate dihydrate, or, citric, boric, or silicic acid, added in variable concentrations ranging from about 1.0% (wt/wt) to about 5.0% (wt/wt) by mass of the mixture including water, to reduce mixture air content and to extend the time of set and/or working time. Some additions of sodium tetraborate can occur, but the concentrations are generally less than 1.5% (wt/wt) due to the reaction between the tetraborate and the PVA, which many times is deleterious and causes a thickening. Protein is added as a portion of the cementitious material in concentrations ranging from about 0.005% (wt/wt) to about 1.0% (wt/wt), with the proviso that protein is provided at the minimum concentration which will produce a covalent bond between mixture silicates and produced hydroxides therein temporarily removing the mixture sticky/tacky characteristic and reducing mixture volume change, but less than the amount at which undesirable amounts of air are produced. Polyvinyl Alcohol (PVA) is added to the mixture in concentrations varying from about 0.5% (wt/wt) to about 15.0% (wt/wt). The dosage of PVA is determined based upon trial and error utilizing cured specimens submerged in water and hydrofluoric acid. The PVA dosage is selected when mass loss after continued exposure to hydrofluoric acid is less than 5.0% in 30 days, and, comparable specimens exposed to water submersion are unaffected relative to mass loss and/or strength loss. Water is added to the mixture in mass amounts ranging from about 10% (wt/wt) to about 30% (wt/wt), such that the concentration of water is effective to produce slump consistencies and other characteristics that comply with project requirements, and appropriate for the intended purpose ranging from a masonry mortar consistency for vertical or overhead concrete repairs, masonry mortar joints, horizontal concrete repairs, sealants, liners, and/or structural walls, slabs, beams, or columns, to a self-consolidating or self-leveling consistency. Water should be added to the composite dry material blend, mixed for from 5 to 10 minutes, and then placed in the time period applicable based upon the intended application and the designed working period.

Aggregate materials including hydrofluoric resistant aggregate can be added to the mixture to reduce cementitious material concentrations. Typical aggregates include calcium free and silicon dioxide free materials that are typically manmade and are designed for the intended purpose, or are a waste product from various industries including the petrochemical and other industrial production industries, including PVC, rubber, and other production.

The mixture has been formulated in accordance with Table 3, as set forth below.

TABLE 3

Mixtures:

| | MORTAR CONSISTENCY | | | |
| --- | --- | --- | --- | --- |
| | Low Slump 1" to 3" Slump | Medium Slump 3" to 6" Slump | Low Range | High Range |
| ¼" Butyl Rubber, lbs-% | 528.3-16.4% | 500.8-14.6% | 5.00% | 30.00% |
| GGBFS, lbs-% | 765.5-23.8% | 834.0-24.3% | 0.00% | 65.00% |
| Class F Fly Ash, lbs-% | 765.5-23.8% | 834.0-24.3% | 0.00% | 65.00% |
| Metasilicate, lbs-% | 160.2-5.0% | 160.2-4.7% | 3.00% | 12.00% |
| Tetraborate lbs-% | 96.1-3.0% | 85.5-2.5% | 1.00% | 5.00% |
| ¼" Nylon Micro Fibers, lbs-% | 4-.12% | 4-.12% | 0.05% | 1.00% |
| Protein, lbs-% | 1.8-.06% | 2-.06% | 0.005% | 1.00% |
| PVA, lbs-% | 210.3-6.5% | 222.8-6.5% | 0.50% | 15.00% |
| Fluorosurfactant, oz % | 110-3.4% | 110-3.2% | 0.90% | 8.00% |
| Water, lbs-% | 580.8-18.0% | 680-19.8% | 10.00% | 30.00% |
| Total | 3222.5 | 3433.3 | | |

NOTES:
For this mixture, the slump consistency was increased by adjusting the water content, and removing the Fern Oil.
Slump consistencies can also be adjusted by adding Fern Oil at variable concentrations, or, adding Fern Oil at a consistent concentration and adjusting the water mass.
The individual slump consistency mixture mass weights produce an approximate cubic yard of concrete by volume, based upon the individual material specific gravity.
While mixing together GGBFS and Fly Ash many times produces specified properties, using only one of the materials can occur.
The individual slump consistency mixture mass weights produce an approximate cubic yard of concrete by volume, based upon the individual material specific gravity.
While mixing together GGBFS and Fly Ash many times produces specified properties, using only one of the materials can occur.

TABLE 3-continued

| Test Results: | Low | Medium |
| --- | --- | --- |
| Strength, 24 hours, psi | 350 | 270 |
| Strength, 28 days, psi | 4,480 | 3,900 |
| % Mass Loss When Submerged In Reagents for 30 days Reagent | | |
| Sulfuric Acid (98%) | 0.0 | 0.0 |
| Acetic Acid (60%) | 0.0 | 0.0 |
| Hydrochloric Acid (50%) | 0.0 | 0.0 |
| Nitric Acid (50%) | 0.1 | 0.0 |
| Hydrofluoric Acid (57%) | 2.0 | 3.0 |
| Phosphoric Acid (70%) | 0.0 | 0.0 |

EXAMPLE 4

In order to produce an aggregate, sand, and cementitious material that can be pumped or otherwise deposited in place that creates a mixture resistant to acids, sulfates, chlorides, and heat exposure up to 1,200 degrees Fahrenheit, reagent resistant mineral aggregate such as, but not limited to high silicon dioxide content alluvial quartzite deposits, mined basalt, or mined marble with maximum aggregate sizes of from about 12 inches to size #200 um sieve are combined to ratios which create a dense concrete mixture that, when analyzed on an XY graph raised to the 0.45 power do not deviate from the maximum density line more than 35%, and with a maximum aggregate size to layer thickness ratio of 3 to 1. The combined aggregate should be, in terms of mass, from about 20% (wt/wt) to about 80% (wt/wt) of the final cementitious mixture mass including water. Pollinated Fern Oil is added to the mineral aggregate, in a saturated surface dry, saturated wet, or dry condition and prior to the inclusion of other mixture ingredients to a fern oil concentration of about 0.05% (wt/wt) to about 1.0% (wt/wt) of the final cementitious mixture mass including water.

Cementitious materials should be combined with the dry materials including the Pollinated Fern Oil™ in the case of dry bagged cementitious mixtures, or separately in the case of wet batched concrete mixtures. The cementitious materials should include, either singly or combined, at least one of fly ash (Class C or Class F), and GGBFS added in variable concentrations dependent upon mixture strength, volume change, carbonation, and rheological behavior to mass concentrations ranging to a maximum of 50% (wt/wt), typically from about 9% (wt/wt) to about 50% (wt/wt). Each of the fly ash concentrations and GGBFS concentrations of the mixture should be selected by balancing mass and volume amounts of each in mixture designs until characteristics are as specified by project requirements. The cementitious materials should include sodium or potassium metasilicate or sodium or potassium metasilicate pentahydrate, added in variable concentrations dependent upon mixture strength, volume change, carbonation, and rheological behavior to mass concentrations ranging from about 2% (wt/wt) to about 7% (wt/wt). The metasilicate/pentahydrate concentrations of the mixture should be selected by balancing mass and volume amounts in mixture designs until characteristics comply with project requirements. The cementitious materials should include sodium tetraborate, sodium citrate dihydrate, or, citric, boric, or silicic acid, added in variable concentrations ranging from about 0.5% (wt/wt) to about 5.0% (wt/wt) by mass of the mixture including water, to reduce mixture air content and to extend the time of set and/or working time. Protein is added as a portion of the cementitious material in concentrations ranging from about 0.01% (wt/wt) to about 0.1% (wt/wt), with the proviso that protein is provided at the minimum concentration which will produce a covalent bond between mixture silicates and produced hydroxides therein temporarily removing the mixture sticky/tacky characteristic and reducing mixture volume change, but less than the amount at which undesirable amounts of air are produced. Water is added to the mixture in mass amounts ranging from about 3% (wt/wt) to about 10% (wt/wt), such that the concentration of water is effective to produce slump consistencies that comply with project requirements that are appropriate for the intended purpose ranging from sidewalk concrete to structural water dams, nuclear and hydrocarbon power generation, foundations, high-rise buildings, and all points in-between in conventional, self-consolidating, pneumatic, or self-leveling applications. When all constituents are combined, the material should be mixed for from 2 to 7 minutes prior to placement and/or curing.

The mixture has been formulated in accordance with Table 4, as set forth below.

TABLE 4

| | MORTAR CONSISTENCY | | | | | | | |
| --- | --- | --- | --- | --- | --- | --- | --- | --- |
| Mixtures: | Low Slump (1" to 3" Slump) | | Medium Slump (2" to 6" Slump) | | High Slump 6" to 10" Slump | | Low Range | High Range |
| 3/8" Quartzite Agg., lbs-% | 1334.7 | 34.2% | 1334.7 | 34.2% | 1334.7 | 34.2% | 0.00% | 50.00% |
| Sand, lbs-% | 1334.7 | 34.2% | 1334.7 | 34.2% | 1334.7 | 34.2% | 0.00% | 50.00% |
| GGBFS, lbs-% | 370.7 | 9.5% | 370.7 | 9.5% | 370.7 | 9.5% | 0.00% | 50.00% |
| Class F Fly Ash, lbs-% | 430.1 | 11.0% | 430.1 | 11.0% | 430.1 | 11.0% | 0.00% | 50.00% |
| Metasilicate, lbs-% | 118.6 | 3.0% | 118.6 | 3.0% | 118.6 | 3.0% | 2.00% | 7.00% |
| Tetraborate, lbs-% | 74.1 | 1.9% | 74.1 | 1.9% | 74.1 | 1.9% | 0.50% | 5.00% |
| ¾" PVC Micro Fibers, lbs | 2.5 | 0.06% | 2.5 | 0.06% | 2.5 | 0.06% | 0.01% | 0.10% |
| ¼" Nylon Micro Fibers, lbs-% | 3 | 0.08% | 3.0 | 0.08% | 3.0 | 0.08% | 0.01% | 0.10% |

TABLE 4-continued

| | | | | | | | | |
|---|---|---|---|---|---|---|---|---|
| Protein, lbs-% | 2.2 | 0.06% | 2.2 | 0.06% | 2.2 | 0.06% | 0.01% | 0.10% |
| **Fern Oil, ozs-% | 75 | 0.13% | 100 | .017% | 125 | 0.22% | 0.05% | 1.00% |
| Water, lbs-% | 228.4 | 5.85% | 228.4 | 5.85% | 228.4 | 5.85% | 3.00% | 10.00% |
| Total: | 3904.1 | | 3905.7 | | 3907.4 | | | |

NOTES:
The mass of Fern Oil was calculated for the purpose of mixture mass summation and % of sum mass using the following calculation: ((liquid ounces/128) × (8.33 (weight of water per gallon) × 1.035 (Fern Oil specific gravity))
For this mixture, the slump consistency was increased by maintaining the water mass and increasing the Fern Oil. The slump consistency can also be increased by maintaining the Fern Oil concentration, and increasing the water mass.
The individual slump consistency mixture mass weights produce an approximate cubic yard of concrete by volume, based upon the individual material specific gravity.
Larger or smaller aggregate may be used for project specific requirements. While the guidelines in the American Concrete Institute Manual of Concrete Practice may be followed for aggregate and cementitious concentrations, determining the optimal aggregate and cementitious concentrations is performed based upon project requirements, the mineral aggregate particle shape and size, and the required work-ability of the mixture based upon user requirements.
While mixing together GGBFS and Fly Ash many times produces specified properties, using only one of the materials can occur.

| Test Results: | Low | Medium | High |
|---|---|---|---|
| Strength, 24 hours, psi | 1290 | 1200 | 1160 |
| Strength, 28 days, psi | 7140 | 7230 | 6990 |
| % Mass Loss When Submerged In Reagents for 30 days | | | |
| Reagent | | | |
| Sulfuric Acid (98%) | 0 | 0 | 0 |
| Acetic Acid (60%) | 0 | 0 | 1 |
| Hydrochloric Acid (50%) | 0.1 | 0.1 | 0.1 |
| Nitric Acid (50%) | 0.3 | 0.4 | 0.3 |
| Phosphoric Acid (70%) | 0.1 | 0.4 | 0.4 |

EXAMPLE 5

In order to produce an aggregate, sand, and cementitious material that can be pumped or otherwise deposited in place that creates a mixture resistant to acids, sulfates, chlorides, and heat exposure up to 1,200 degrees Fahrenheit, reagent resistant mineral aggregate such as, but not limited to high silicon content alluvial quartzite deposits, mined basalt, or mined marble with maximum aggregate sizes of from about 12 inches to size #200 um sieve are combined to ratios which create a dense concrete mixture that, when analyzed on an XY graph raised to the 0.45 power do not deviate from the maximum density line more than 35%, and with a maximum aggregate size to layer thickness ratio of 3 to 1. The combined aggregate should be, in terms of mass, from about 20% (wt/wt) to about 80% (wt/wt) of the final cementitious mixture mass including water. Pollinated Fern Oil is added to the mineral aggregate, in a saturated surface dry, saturated wet, or dry condition and prior to the inclusion of other mixture ingredients to a fern oil concentration of about 0.01% (wt/wt) to about 0.1% (wt/wt) of the final cementitious mixture mass including water.

Cementitious materials should be combined with the dry materials including the Pollinated Fern Oil™ in the case of dry bagged cementitious mixtures, or separately in the case of wet batched concrete mixtures. The cementitious materials should include fly ash (Class C or Class F), added in variable concentrations dependent upon mixture strength, volume change, carbonation, and rheological behavior to mass concentrations ranging from 10.0% (wt/wt) to 40% (wt/wt). The fly ash concentrations of the mixture should be selected by balancing fly ash mass and volume amounts in mixture designs until characteristics comply with project requirements. The cementitious materials should include sodium or potassium metasilicate or sodium or potassium metasilicate pentahydrate, added in variable concentrations dependent upon mixture strength, volume change, carbonation, and rheological behavior to mass concentrations ranging from about 2% (wt/wt) to about 7% (wt/wt). The metasilicate/pentahydrate concentrations of the mixture should be selected by balancing mass and volume amounts in mixture designs until characteristics comply with project requirements. The cementitious materials should include sodium tetraborate, sodium citrate dihydrate, or, citric, boric, or silicic acid, added in variable concentrations ranging from about 0.5% (wt/wt) to about 5.0% (wt/wt) by mass of the mixture including water, to reduce mixture air content and to extend the time of set and/or working time. Protein is added as a portion of the cementitious material in concentrations ranging from about 0.01% (wt/wt) to about 0.1% (wt/wt), with the proviso that protein is provided at the minimum concentration which will produce a covalent bond between mixture silicates and produced hydroxides therein temporarily removing the mixture sticky/tacky characteristic and reducing mixture volume change, but less than the amount at which undesirable amounts of air are produced. Water is added to the mixture in mass amounts ranging from about 3% (wt/wt) to about 10% (wt/wt), such that the concentration of water is effective to produce slump consistencies that comply with project requirements that are appropriate for the intended purpose ranging from sidewalk concrete to structural water dams, nuclear and hydrocarbon power generation, foundations, high-rise buildings, and all points in-between in conventional, self-consolidating, pneumatic, or self-leveling applications. When all constituents are combined, the material should be mixed for from 2 to 7 minutes prior to placement and/or curing.

The mixture has been formulated in accordance with Table 5, as set forth below.

TABLE 5

| Mixtures: | MORTAR CONSISTENCY | | | | | | Low Range | High Range |
|---|---|---|---|---|---|---|---|---|
| | Low Slump (1" to 3" Slump) | | Medium Slump (2" to 6" Slump) | | High Slump 6" to 10" Slump | | | |
| ⅜" Quartzite Agg., lbs-% | 1282.4 | 33.6% | 1282.4 | 33.6% | 1282.4 | 33.6% | 10.00% | 50.00% |
| Concrete Sand, lbs-% | 1282.4 | 33.6% | 1282.4 | 33.6% | 1282.4 | 33.6% | 10.00% | 50.00% |
| Class F Fly Ash, lbs-% | 820.3 | 21.5% | 820.3 | 21.5% | 820.3 | 21.4% | 10.00% | 40.00% |
| Metasilicate, lbs-% | 116.6 | 3.1% | 116.6 | 3.1% | 116.6 | 3.1% | 2.00% | 7.00% |
| Tetraborate, lbs-% | 72.8 | 1.9% | 72.8 | 1.9% | 72.8 | 1.9% | 0.50% | 5.00% |
| ¾" PVC Macro Fibers, lbs-% | 3.0 | 0.08% | 3.0 | 0.08% | 3.0 | 0.08% | 0.01% | 0.10% |
| ¼" Nylon Micro Fibers, lbs-% | 3.0 | 0.08% | 3.0 | 0.08% | 3.0 | 0.08% | 0.01% | 0.10% |
| Protein, lbs-% | 2.8 | 0.06% | 2.8 | 0.06% | 2.8 | 0.06% | 0.01% | 0.10% |
| **Fern Oil, ozs-% | 75 | 0.13% | 100 | 0.17% | 125 | 0.22% | 0.05% | 1.00% |
| Water, lbs-% | 233.5 | 6.11% | 233.5 | 6.11% | 233.5 | 6.11% | 3.00% | 10.00% |
| Total: | 3821.9 | | 3823.5 | | 3825.2 | | | |

NOTES:
The mass of Fern Oil was calculated for the purpose of mixture mass summation and % of sum mass using the following calculation: ((liquid ounces/128) × (8.33 (weight of water per gallon) × 1.035 (Fern Oil specific gravity))
For this mixture, the slump consistency was increased by maintaining the water mass and increasing the Fern Oil. The slump consistency can also be increased by maintaining the Fern Oil concentration, and increasing the water mass.
The individual slump consistency mixture mass weights produce an approximate cubic yard of concrete by volume, based upon the individual material specific gravity.
Larger or smaller aggregate may be used for project specific requirements. While the guidelines in the American Concrete Institute Manual of Concrete Practice may be followed for aggregate and cementitious concentrations, determining the optimal aggregate and cementitious concentrations is performed based upon project requirements, the mineral aggregate particle shape and size, and the required work-ability of the mixture based upon user requirements.
This mixture uses only Fly Ash with no mixture of Granulated Ground Blast Furnace Slag (GGBFS).

| Test Results: | Low | Medium | High |
|---|---|---|---|
| Strength, 24 hours, psi | 1,350 | 1,110 | 980 |
| Strength, 28 days, psi | 8,560 | 7,360 | 6,770 |
| % Mass Loss When Submerged In Reagents for 30 days | | | |
| Reagent | | | |
| Sulfuric Acid (98%) | 0 | 0 | 0 |
| Acetic Acid (60%) | 0 | 0 | 0 |
| Hydrochloric Acid (50%) | 0 | 0 | 0 |
| Nitric Acid (50%) | 0.05 | 0.05 | 0.2 |
| Phosphoric Acid (70%) | 0 | 0 | 0 |

EXAMPLE 6

In order to produce an aggregate, sand, and cementitious material that can be pumped or otherwise deposited in place that creates a mixture resistant to acids, sulfates, chlorides, and heat exposure up to 1,200 degrees Fahrenheit, reagent resistant mineral aggregate such as, but not limited to high silicon content alluvial quartzite deposits, mined basalt, or mined marble with maximum aggregate sizes of from about 12 inches to size #200 um sieve are combined to ratios which create a dense concrete mixture that, when analyzed on an XY graph raised to the 0.45 power do not deviate from the maximum density line more than 35%, and with a maximum aggregate size to layer thickness ratio of 3 to 1. The combined aggregate should be, in terms of mass, from about 20% (wt/wt) to about 80% (wt/wt) of the final cementitious mixture mass including water. Pollinated Fern Oil is added to the mineral aggregate, in a saturated surface dry, saturated wet, or dry condition and prior to the inclusion of other mixture ingredients to a fern oil concentration of about 0.01% (wt/wt) to about 0.1% (wt/wt) of the final cementitious mixture mass including water.

Cementitious materials should be combined with the dry materials including the Pollinated Fern Oil™ in the case of dry bagged cementitious mixtures, or separately in the case of wet batched concrete mixtures. The cementitious materials should include GGBFS, added in variable concentrations dependent upon mixture strength, volume change, carbonation, and rheological behavior to mass concentrations ranging from 10.0% (wt/wt) to 40% (wt/wt). The GGBFS concentrations of the mixture should be selected by balancing the mass and volume amounts in mixture designs until characteristics comply with project requirements. The cementitious materials should include sodium or potassium metasilicate or sodium or potassium metasilicate pentahydrate, added in variable concentrations dependent upon mixture strength, volume change, carbonation, and rheological behavior to mass concentrations ranging from about 2% (wt/wt) to about 7% (wt/wt). The metasilicate/pentahydrate concentrations of the mixture should be selected by balancing mass and volume amounts in mixture designs until characteristics comply with project requirements. The cementitious materials should include sodium tetraborate, sodium citrate dihydrate, or, citric, boric, or silicic acid, added in variable concentrations ranging from about 0.5% (wt/wt) to about 5.0% (wt/wt) by mass of the mixture including water, to reduce mixture air content and to extend the time of set and/or working time. Protein is added as a portion of the cementitious material in concentrations ranging from about 0.01% (wt/wt) to about 0.1% (wt/wt), with the proviso that protein is provided at the minimum concentration which will produce a covalent bond between mixture silicates and produced hydroxides therein temporarily removing the mixture sticky/tacky characteristic and reducing mixture volume change, but less than the amount at which undesirable amounts of air are produced. Water is added to the mixture in mass amounts ranging from about 3% (wt/wt) to about 10% (wt/wt), such that the concentration of water is effective to produce slump consistencies that comply with project requirements that are appropriate for the intended purpose ranging from sidewalk concrete to structural water dams, nuclear and hydrocarbon power generation, foundations, high-rise buildings, and all points in-between in conventional, self-consolidating, pneumatic, or self-leveling applications. When all constituents are combined, the material should be mixed for from 2 to 7 minutes prior to placement and/or curing.

The mixture has been formulated in accordance with Table 6, as set forth below.

and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended

TABLE 6

Mixtures:

| | MORTAR CONSISTENCY | | | | |
|---|---|---|---|---|---|
| | Low Slump 1" to 3" Slump | Medium Slump 3" to 6" Slump | High Slump 6" to 10" Slump | Low Range | High Range |
| ⅜" Quartzite Agg., lbs-% | 1315.1-33.8% | 1315.1-33.8% | 1315.1-33.8% | 10.00% | 50.00% |
| Concrete Sand, lbs-% | 1315.1-33.8% | 1315.1-33.8% | 1315.1-33.8% | 10.00% | 50.00% |
| GGBFS, lbs-% | 845.0-21.7% | 845.0-21.7% | 845.0-21.7% | 10.00% | 40.00% |
| Metasilicate, lbs-% | 118.3-3.0% | 118.3-3.0% | 118.3-3.0% | 2.00% | 7.00% |
| Tetraborate, lbs-% | 62.7-1.6% | 62.7-1.6% | 62.7-1.6% | 0.50% | 5.00% |
| ¾" PVC Macro Fibers, lbs | 3.0-.08% | 3.0-.08% | 3.0-.08% | 0.01% | 0.10% |
| ¼" Nylon Micro Fibers, lbs-% | 3.0-.08% | 3.0-.08% | 3.0-.08% | 0.01% | 0.10% |
| Protein, lbs-% | 2.0-.05% | 2.0-.05% | 2.0-.05% | 0.01% | 0.10% |
| **Fern Oil, ozs-% | 75-.13% | 100-.17% | 125-.22% | 0.05% | 1.00% |
| Water, lbs-% | 219.9-5.65% | 219.9-5.65% | 219.9-5.65% | 3.00% | 10.00% |
| Total | 3873.7 | 3875.3 | 3877.0 | | |

NOTES:
The mass of Fern Oil was calculated for the purpose of mixture mass summation and % of sum mass using the following calculation: ((liquid ounces/128) X (8.33 (weight of water per gallon) X 1.035 (Fern Oil specific gravity))
For this mixture, the slump consistency was increased by maintaining the water mass and increasing the Fern Oil. The slump consistency can also be increased by maintaining the Fern Oil concentration, and increasing the water mass.
The individual slump consistency mixture mass weights produce an approximate cubic yard of concrete by volume, based upon the individual material specific gravity.
Larger or smaller aggregate may be used for project specific requirements. While the guidelines in the American Concrete Institute Manual of Concrete Practice may be followed for aggregate and cementitious concentrations, determining the optimal aggregate and cementitious concentrations is performed based upon project requirements, the mineral aggregate particle shape and size, and the required work-ability of the mixture based upon user requirements.
This mixture uses only Granulated Ground Blast Furnace Slag (GGBFS) with no mixture of Fly Ash.

| Test Results: | Low | Medium | High |
|---|---|---|---|
| Strength, 24 hours, psi | 2,620 | 2,470 | 2,110 |
| Strength, 28 days, psi | 9,460 | 9,020 | 8,690 |
| % Mass Loss When Submerged In Reagents for 30 days Reagent | | | |
| Sulfuric Acid (98%) | 0.2 | 0.4 | 0.4 |
| Acetic Acid (60%) | 0.1 | 0.1 | 0.1 |
| Hydrochloric Acid (50%) | 0.1 | 0.3 | 0.4 |
| Nitric Acid (50%) | 0 | 0 | 0 |
| Phosphoric Acid (70%) | 0 | 0 | 0 |

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cold fusion concrete formulation that can be trowel applied, or poured into place, that is resistant to acids, sulfates, chlorides, and heat exposure up to 1,200 degrees Fahrenheit, wherein said formulation comprises:

a reagent resistant mineral aggregate;
a fern oil in an amount from about 0.05 (wt/wt) to about 1.0% (wt/wt) of the total weight of said formulation, including water;
a cementitious material in an amount from about 8.0% (wt/wt) to about 65% (wt/wt) of the total weight of said formulation, inclusive of water, including at least one of Class C fly ash, Class F fly ash, and granulated ground blast furnace slag;
a set time retardant comprising sodium tetraborate, sodium citrate dihydrate, citric acid, boric acid, or silicic acid;
a protein, in concentrations ranging from about 0.005% (wt/wt) to about 1% (wt/wt) of said cementitious material; and
water.

2. The cold fusion concrete formulation of claim 1, wherein said reagent resistant mineral aggregate includes at least one member selected from quartzite, basalt, or marble with a maximum aggregate size within the range of about 0.0029 inches(74 μm) to about 0.25 inches.

3. The cold fusion concrete formulation of claim 1 wherein said cementitious material includes at least one member selected from sodium metasilicate, potassium metasilicate, sodium pentahydrate and potassium pentahydrate, at a concentration within the range of about 2% (wt/wt) to about 7% (wt/wt).

4. The cold fusion concrete formulation of claim 1 wherein said set time retardant includes at least one member selected from sodium tetraborate, sodium citrate dihydrate, citric acid, boric acid, and silicic acid, in a concentration within the range from about 0.5% (wt/wt) to about 5.0% (wt/wt) by total mass including water.

5. A cold fusion concrete formulation according to claim 1 wherein:
said aggregate comprises from about 10% (wt/wt) to about 50% (wt/wt) of size# 8 sand and from about 10% (wt/wt) to about 50% (wt/wt) of size# 30 sand;
said cementitious material comprises from about 8.0% (wt/wt) to about 40% (wt/wt) of at least one member including granulated ground blast furnace slag and Class F Fly Ash;
said formulation further comprises from about 2% (wt/wt) to about 7% (wt/wt) of at least one member selected from sodium metasilicate, potassium metasilicate, sodium pentahydrate and potassium pentahydrate;
said formulation further comprises from about 0.5% (wt/wt) to about 7% (wt/wt) of sodium tetraborate;
said formulation further comprises from about 0.01% (wt/wt) to about 0.1% (wt/wt) 0.75" polyvinyl chloride microfibers; and
said formulation further comprises from about 0.01% (wt/wt) to about 0.1% (wt/wt) 0.25" nylon microfibers.

6. A cold fusion concrete formulation according to claim 1 wherein:
said aggregate comprises from about 2% (wt/wt) to about 5% (wt/wt) of expanded glass of 4 mm-8 mm; from about 2% (wt/wt) to about 5% (wt/wt) of expanded glass of 2 mm-4 mm; from about 2% (wt/wt) to about 5% (wt/wt) of expanded glass of 0.5 mm-1 mm; and from about 1% (wt/wt) to about 5% (wt/wt) of expanded glass of 0.1 mm-0.3 mm;
said cementitious material comprises from about 15% (wt/wt) to about 65% (wt/wt) of at least one member including granulated ground blast furnace slag and Class F Fly Ash;
said formulation further comprises from about 3% (wt/wt) to about 10% (wt/wt) of at least one member selected from sodium metasilicate, potassium metasilicate, sodium pentahydrate and potassium pentahydrate;
said formulation further comprises from about 1% (wt/wt) to about 5% (wt/wt) of sodium tetraborate;
said formulation further comprises from about 0.05% (wt/wt) to about 1.0% (wt/wt) of 0.25" nylon microfibers;
said formulation further comprises from about 0.05% (wt/wt) to about 1.0% (wt/wt) protein; and
from about 7.0% (wt/wt) to about 25% (wt/wt) water.

7. A cold fusion concrete formulation according to claim 1 wherein:
said formulation further comprises from about 5% (wt/wt) to about 30% (wt/wt) of 0.25" butyl rubber;
said cementitious material comprises from about 10% (wt/wt) to about 65% (wt/wt) of at least one of granulated ground blast furnace slag or Class F Fly Ash;
said formulation further comprises from about 3% (wt/wt) to about 12% (wt/wt) of at least one member selected from sodium metasilicate, potassium metasilicate, sodium pentahydrate and potassium pentahydrate;
said formulation further comprises from about 1% (wt/wt) to about 5% (wt/wt) of sodium tetraborate;
said formulation further comprises from about 0.05% (wt/wt) to about 1.0% (wt/wt) of 0.25" nylon microfibers; and
said formulation further comprises from about 0.5% (wt/wt) to about 15.0% (wt/wt) polyvinyl alcohol; and
from about 10.0% (wt/wt) to about 30% (wt/wt) water.

8. A cold fusion concrete formulation according to claim 1 wherein:
said aggregate comprises from about 30% (wt/wt) to about 50% (wt/wt) of 0.375" quartzite aggregate; and from about 30% (wt/wt) to about 50% (wt/wt) sand;
said cementitious material comprises from about 9.0% (wt/wt) to about 50% (wt/wt) of at least one member including granulated ground blast furnace slag and Class F Fly Ash;
said formulation further comprises from about 2% (wt/wt) to about 7% (wt/wt) of at least one member selected from sodium metasilicate, potassium metasilicate, sodium pentahydrate and potassium pentahydrate;
said formulation further comprises from about 0.5% (wt/wt) to about 5% (wt/wt) of sodium tetraborate;
said formulation further comprises from about 0.01% (wt/wt) to about 0.1% (wt/wt) of 0.75" polyvinyl chloride microfibers;
said formulation further comprises from about 0.01% (wt/wt) to about 0.1% (wt/wt) of 0.25" nylon microfibers;
from about 0.01% (wt/wt) to about 0.1% (wt/wt) protein; and
from about 3.0% (wt/wt) to about 10% (wt/wt) water.

9. A cold fusion concrete formulation according to claim 1 wherein:
said aggregate comprises from about 10% (wt/wt) to about 50% (wt/wt) of 0.375" quartzite aggregate; and from about 10% (wt/wt) to about 50% (wt/wt) sand;
said cementitious material comprises from about 10% (wt/wt) to about 40% (wt/wt) Class F Fly Ash;
said formulation further comprises from about 2% (wt/wt) to about 7% (wt/wt) of at least one member selected from sodium metasilicate, potassium metasilicate, sodium pentahydrate and potassium pentahydrate;

said formulation further comprises from about 0.5% (wt/wt) to about 5% (wt/wt) of sodium tetraborate;

said formulation further comprises from about 0.01% (wt/wt) to about 0.1% (wt/wt) of 0.75" polyvinyl chloride microfibers;

said formulation further comprises from about 0.01% (wt/wt) to about 0.1% (wt/wt) of 0.25" nylon microfibers; and from about 3.0% (wt/wt) to about 10% (wt/wt) water.

10. A cold fusion concrete formulation according to claim 1 wherein:

said aggregate comprises from about 10% (wt/wt) to about 50% (wt/wt) of 0.375" quartzite aggregate; and from about 10% (wt/wt) to about 50% (wt/wt) sand;

said cementitious material comprises from about 10% (wt/wt) to about 40% (wt/wt) of granulated ground blast furnace slag;

said formulation further comprises from about 2% (wt/wt) to about 7% (wt/wt) of at least one member selected from sodium metasilicate, potassium metasilicate, sodium pentahydrate and potassium pentahydrate;

said formulation further comprises from about 0.5% (wt/wt) to about 5% (wt/wt) of sodium tetraborate;

said formulation further comprises from about 0.01% (wt/wt) to about 0.1% (wt/wt) of 0.75" polyvinyl chloride microfibers; and said formulation further comprises from about 0.01% (wt/wt) to about 0.1% (wt/wt) of 0.25" nylon microfibers.

11. A cold fusion concrete formulation according to claim 1 wherein:

said aggregate comprises sand, gravel, crushed stone, iron blast-furnace slag, carbon or carbonate containing aggregate materials, quartzite, mined basalt, mined marble, vermiculite, volcanic cinders, expanded glass, expanded shale, manmade and/or coal combustion by-product cenospheres, or bottom ash;

said formulation further comprises at least one activator selected from sodium metasilicate, potassium metasilicate, sodium pentahydrate or potassium pentahydrate;

said formulation further comprises at least one strengthening agent comprising calcium hydroxide, potassium hydroxide, magnesium hydroxide, sodium hydroxide, or aluminum hydroxide; and said formulation further comprises at least one of attapulgite clay, kaolin clay, and red clay.

12. The cold fusion concrete formulation of claim 11, further including at least one fluorosurfactant.

13. The cold fusion concrete formulation of claim 11, further including at least one member selected from a zeolite, diatomaceous earth, and volcanic minerals.

14. The cold fusion concrete formulation of claim 11, further including at least one fiber selected from fibers of polyvinyl chloride (PVC), steel, nylon, para-aramid synthetic fibers, glass, basalt, and ceramic of variable denier, length, and shape.

15. The cold fusion concrete formulation of claim 12, further including at least one polyvinylalcohol.

* * * * *